Figure 1:
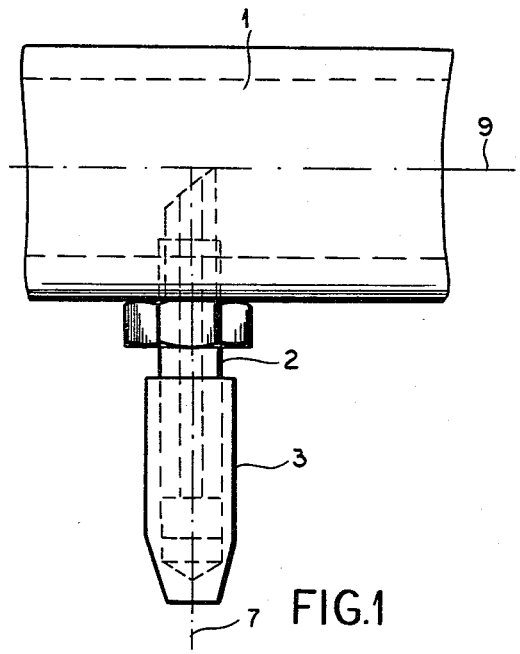

United States Patent [19]

Alajos et al.

[11] 4,365,757
[45] Dec. 28, 1982

[54] WATER FEEDING HEAD

[75] Inventors: Dobos Alajos; Gyula Kiss; Béla Gáspár; Géza Imre; Julia Jóny née Ács; István Fórián; István Ijjas; Ferenc Lipták; Vilma Bisits née Zsilinszky, all of Budapest, Hungary

[73] Assignee: Agrober Mezogazdasagi es Elelmiszeripari Tervezo, Beruhazasi Vallalat, Budapest, Hungary

[21] Appl. No.: 265,560

[22] Filed: May 20, 1981

Related U.S. Application Data

[63] Continuation of Ser. No. 85,796, Oct. 17, 1979, abandoned.

[51] Int. Cl.³ .............................................. B05B 1/18
[52] U.S. Cl. .................................................. 239/567
[58] Field of Search ............... 239/550, 567, 542, 566

[56] References Cited

U.S. PATENT DOCUMENTS

| 479,922 | 8/1892 | Sugg | 239/567 |
|---|---|---|---|
| 2,311,266 | 2/1943 | Suet | 239/567 |
| 2,650,132 | 8/1953 | Reinecke | 239/567 |
| 3,439,997 | 4/1969 | Hancock et al. | 239/556 |
| 4,159,805 | 7/1979 | Von Lutzow | 239/542 |

FOREIGN PATENT DOCUMENTS

| 2216908 | 10/1972 | France | 239/567 |
|---|---|---|---|
| 2229347 | 5/1973 | France | 239/567 |
| 2213731 | 1/1974 | France | 239/567 |
| 2201719 | 4/1974 | France | 239/567 |
| 2268460 | 3/1975 | France | 239/567 |

*Primary Examiner*—Andres Kashnikow
*Assistant Examiner*—Gene A. Church
*Attorney, Agent, or Firm*—Karl F. Ross

[57] ABSTRACT

The invention relates to a water feeding head suitable for the water supply of row crops, first of all vineyards and orchards. Its use enables the drop feed type irrigation of loose soils so far unsolved.

The water feeding head is assembled from two parts, i.e. from the body releasably connected e.g. with thread to the pipeline and from the replaceable nozzle fitted to the body. The nozzle is provided with one or several orifices discharging the water by drop feed method, and the heads are arranged along the pipeline at a distance from each other in accordance with the transmissivity of the soil.

3 Claims, 18 Drawing Figures

U.S. Patent  Dec. 28, 1982  Sheet 1 of 2  4,365,757

WATER FEEDING HEAD

This is a continuation of application Ser. No. 085,796, filed Oct. 17, 1979 now abandoned.

The invention relates to water feeding head for drop feed type irrigation of row crops, e.g. vineyards and orchards. The water feeding head is connected with a water pipeline that is part of an established or at least temporary water distribution system supplied from some kind of water source, and is provided with an attachment to the pipeline and a water discharge orifice.

The drop feed type irrigation system started to gain general acceptance all over the world at the end of the 1960-ies and beginning of the 1970-ies. It differs from the so-far used irrigation methods in that the quantity of irrigation water necessary in each irrigation season is delivered at a continuous rate, or at least at short intervals, instead of on the four-five occasions, or at the 3-4 weekly intervals as it was customary in Hungary.

Its most important domestic field of application is the irrigation of vineyards and orchards taking place in such a way that for instance the polyethylene hose of small diameter is fastened to the lower metal rope of the wall-tree of a vineyard or orchard (in lack of wall-tree it is fastened for instance onto a row of poles, etc.), in which the drop feed heads are screwed usually at a distance of 2-4 m. Diameter of the heads is normally 0.2-0.6 mm and the water conducted at low pressure in the hose is delivered by dripping onto the soil. The water permeates the soil, thus it wets the root system of the plants, or—due to fault of the system—only part of it.

Its most important advantages utilizable in the large-scale irrigation are the following: water content of the soil can be regulated very well; the optimal water content level is almost continually ensured; the irrigation itself does not require manual labour after laying of the pipes; the process of irrigation can be relatively easily automated. (By keeping the water supply at optimal level, 200-300 q/ha surplus yield of apple has been reached in this country.)

Some of its disadvantages: the small diameter drop feed heads get easily clogged; in large-scale farming where several hundred thousand or million heads are operating, this is a disadvantage that may make its large-scale application questionable; the drop feed heads spaced at a distance of several meters in the line are not capable to wet the whole growing area of the fruit trees, not even in case of impermeable ground and as a result the root system of the trees become distorted (it develops vigorously in the irrigated part, while it lags behind on the dry area); insertion of the heads into the pipe is not mechanized, which manually is nearly insoluble on a large scale.

Such spray heads are frequent—mainly in Austria and USA—where either a single water jet emerges from the spray nozzle and by hitting a plate in front of it, it gets sprayed, or fog-like fine spray emerges through 8-10 tiny—a few tenth of a mm diameter—holes. The mentioned spray heads are used for freshening the foliage of the Citrus varieties and with the fog-like spray the microclimate of the foliage is improved.

The mentioned apparatuses are not suitable for the irrigation of a strip of land area and for delivery of the irrigation water to the root system of the plants. Furthermore no rain-type irrigation is realizable, which through the uniform permeation of the soil would solve the water supply of the fruit trees indigenous in Europe. The reason for this is that the irrigation water is not controllable, it does not permit the intermittent operation, and in addition its laying and further laying requires substantial manpower.

A particular type of the apparatuses functioning according to the above principle is provided with a water feeding head suitable for the irrigation of circular areas. It has approximately 15 small diameter (about 0.7 mm) holes. The heads discharging the sprayed water jet are placed in the crown of the trees. Diameter of the irrigated area is about 0.5 m. Disadvantage of the device is that owing to the spraying method the evaporation loss is high, on the other hand there is no possibility to increase the size of the irrigated area.

At a known solution of the water feeding heads operating with impacted water jet, a hole of 0.3 to 0.6 mm is provided for discharge of the water. The emerging jet hits a plate in front of it, gets sprayed, then falls by graviation. According to the experience, even this water feeding head is suitable only for the irrigation of the foliage, or crown of the trees, but unsuitable for the efficient water supply of the soil.

Such water discharge nozzle also exists which imitates the so-called spray heads. In respect of its shape it is the reduced copy of the pipe and nozzle of the sprinkler type spray head. Its outlet diameter is about 0.3 to 0.4 mm. The nozzle-end counter to the outlet orifice is provided with thread which can be screwed for instance into the cross pipe inserted in the irrigation system. With the aid of the nozzles the stock or stem of the row crops, e.g. vines are aimed at with the water jet. The experiences are not favourable. As a result of sunshine the pipeline suffers deformation, consequently the position of the nozzle will be altered. In addition it is unfavourable that owing to the very large number of the nozzles the assembly and operation are equally labourintensive.

The so-called feeder spirals are found among the relatively more advanced water feeders, one end of which is pushed into the hole on the wall of the cross pipe being part of the pipe system, then the spiral is wound onto the pipe. The spiral is provided with internal hole of 0.4 to 0.6 mm diameter. Drawback of the solution is that the diameter of the hole can not be increased unless the length of the spiral (being 1.0 to 1.5 m at the present) is increased considerably. Because of the small diameter of the hole it would be necessary to purify the irrigation water to the quality of the drinking water, which is rather expensive. It is also unfavourable that no fertilizer can be delivered to the soil with the water feeding spiral.

Amongst the most advanced varieties of the water feeding heads are those which deliver the moisture to the soil by way of dripping. A characteristic type of these is described in the French Pat. No. 2,185,349. Discharge of the water is carried out by the large-headed nails pressed into the so-called cross pipe provided with gaps and/or holes at various shape and size. The large-headed nails may be provided with some kind of cap that prevents passage of the water directly in the jet form. The conceptually correct idea failed in the practice, because the geometrically complicated design of the heads makes them sensitive to clogging and their construction is not simple either.

Similarly drop feed type irrigation apparatus can be found in the French Pat. No. 2,268,460. So-called water feeding bodies are inserted into the cross pipe of the water supply system fixed with clamps to the pipe. The body may be provided with various replaceable heads, which discharge the water through the orifices developed along the mantle surface. Design of the heads is still complicated, sensitive to clogging, material-intensive, production difficult, hence unsuitable for large-scale purposes.

The drop feed type spray head was developed according to the principle different from the foregoing, described in the French Pat. No. 2,201,719. In this the water enters the interior of the spray head from the water delivery pipeline through a large-size orifice, where it is forced to travel a long way and to make several directional changes. The water feeder between the walls of the head developed as a drop feed body can by inserted not only in radial but in axial direction as well into the pipe in such a way that the water is conductible right through. The water is delivered in small drops to the soil. The expectations were not fulfilled, since its construction is even more complicated, production expensive and the very narrow gaps are inclined to clog up at a fast rate.

The drop feed type feeding head described in the French Pat. No. 2,229,347 is also applicable in the pipeline as a pipe connecting adapter. One end of the pipe connecting adapter is provided with a flat thread and it discharges the water quantity according to the geometrical parameters—shape, depth, number—of this thread. The basic idea is correct, but in reality the disadvantages are the same as in case of those mentioned earlier.

Finally it is worth mentioning the drop feed body which can be inserted into low pressure water supply systems and is used for ploughland irrigation. This is described in the French Pat. No. 2,173,616. The drop feed body is provided with thread and the water quantity is regulated by screwing in and out. By screwing the threaded pin fully in, the water feeding is cut out. The emerging water flows in the grooves of the threaded part and passes to the outlet orifice. The solution is ingenious, but extremely complicated, and the irrigation conditions are not more favourable than with the branching pipes provided with clamps. It is too expensive for the small-scale farm, on the other hand in the large-scale farms—owing to the constantly necessary adjustment of the threads and high demand for the labour force—its use is impractical.

The pipelines to be found in the French Pat. No. 2,213,731 are accessories of irrigation plants. From the description and drawings it appears that the liquid is forced to pass along spiral thread and its flow conditions and the rate of flow are determined by the pitch. The water feeding orifices are arranged in the extermal mantle surface of the pipe, through which more or less drop feed-type water discharge is realizable. The solution can not be regarded as fortunate, because the pipeline is expensive and complicated, and the uniformity of the water feeding as the set objective is not realized. The water passes from the internal so-called water delivery pipe into the external irrigation pipe, however it travels only a short distance in the space between the two pipe mantles and even that under unfavourable and practically uncontrollable flow conditions.

The French Pat. No. 2,216,908 demonstrates an irrigation device permitting quantitative control. The vital part of the device is the adjustable threaded drop feed head placeable into the pipe. The water flows in the grooves of the sleeved drop feed thread. A thread regulating the quantity of the outflowing water may be developed in the interior of the pipe. The drop feed head can be fixed in the pipe in a horizontal arrangement too. This solution is also extremely complicated, hence its production is costly and maintenace difficult. For this reason it gained no general use in the practice.

The invention is aimed at the development of such water feeding head with the aid of which row crops, first of all orchards can be supplied with water, and not only on the customary seasonal 4–5 occasions (i.e. at interval of several weeks), but at a continuous rate during the growth season.

Purpose of the invention is to take into primary consideration the aspects of large-scale irrigation in such a manner that drop feed type irrigation should be realized, but with the elimination of the imperfections shown by the solutions until now. These imperfections have been manifest first of all in that the moisture permeating the soil could not supply the root system of the individual plants with sufficient quantity of moisture.

The idea of the invention is based on the recognition that the drop feed irrigation should be realized with holes of large diameter instead of the spray heads of 0.2 to 0.6 mm hole diameter used so far, whereby multiple of the earlier water quantity can be delivered to the ground. It is pertinent to the recognition that one or several water jets should emerge at low pressure from the water feeding head of small size but with relatively large hole diameter, and these jets should reach the ground at a particular spot. Density of the irrigated spots is determined with the types and spacing of the heads in such a way, that an irrigated strip of approximately uniform width should develop on the ground surrounding the row crop from both sides.

In accordance with the set objective the water feeding head according to the invention—which water feeding head is connected with a pipeline that is part of an established or at least temporary water distribution system supplied from some kind of water source and provided with an attachment to the pipeline, and a water discharge orifice,—is constructed in such a way that it is assembled from two parts, i.e. a body connected releasably to the pipeline, e.g. with thread and a replaceable nozzle fitted to the body, the nozzle is provided with one or several orifices letting through the water by drop feed method and the heads are arranged along the pipeline at a distance from each other in accordance with the transmissivity of the soil.

A further criterion of the water feeding head according to the invention may be that the body is of reduced cross section preferably tapered as from the part onward where it joins the pipeline.

The interior of the nozzle surrounding the body or at least a certain part of it is of concave cone or mantle construction. The discharge orifices are constructed in the form of axial orifices in the longitudinal axis of the nozzle and/or radial orifices arranged on the mantle surface of the nozzle. The nozzles are provided with discharge orifices delivering the water onto the soil in points forming a continuous network in the strip along the longitudinal axis of the pipeline.

In a suitable embodiment of the water feeding head the longitudinal axes of the nozzles of the fastened-on heads are perpendicular to the longitudinal axis of the pipeline.

The main advantage of the water feeding head according to the invention is that it allows to meet such demands for which there has been no way so far. And this is the drop feed type irrigation of the loose soils.

This drop feed irrigation is solved with the aid of pipeline and a large number of water feeding heads connected to the pipeline. Its technical advantage is that the heads are separated to body and nozzle, the body being identical in every case, consequently its production and insertion into the pipes can be accomplished with high productivity and efficient mechanization. The bodies of identical construction allow the connection of various nozzles with maximum adaptation to the need and with precision replacement.

The experiences with the water feeding head according to the invention have been definitely favourable so far. In case of individual plants, e.g. fruit trees, the irrigation at one or two points is substituted with the whole strip of area being supplied with water, where the root system of the plants is situated.

It is also favourable that the water can be directed to the required spot with the water feeding head, and the size of the nozzles and spacing of the heads along the pipelines make it possible that the so-called total permeatic in the required strip of the ground should take place with safety, and thus the optimal water content will be available for the soil in respect of the plant growing in question. This is facilitated also by the irrigation being suitably intermittent and programmable.

The water feeding head according to the invention realizes the internationally unsolved problem of irrigation of the orchards efficiently in loose, sandy soil in small water portions at low pressure. The method retains all the known advantages of the drop feed irrigation and at the same time it eliminates all the disadvantages so far inhibiting the large-scale application. In reality only the elements and principles of the drop feed irrigation have been retained, thus the nozzles mounted on the pipeline, the low operating pressure and the lateral seepage in the soil. Consequently the subject of this invention can be no longer regarded as drop feed head, but rather as water feeding head.

The invention is described in detail on the basis of drawings by way of examples of the embodiment. The attached drawings illustrate the following:

FIG. 1 the connection of pipeline and water feeding head,

FIGS. 2 to 5, the longitudinal section of the various embodiments of the nozzles, FIGS. 6 to 13, the cross sections of various embodiments of the nozzles, FIGS. 14 to 18 the irrigated strip of the ground in case of nozzles provided with various orifices.

FIG. 1 shows the pipeline 1 with one water feeding head assembled from the body 2, and the nozzle 3. The body 2 is radially inserted into the pipeline 1, preferably secured with screw nut while the longitudinal axis 7 of the nozzle 3 is perpendicular to the longitudinal axis 9 of the pipeline 1.

Figure 2:
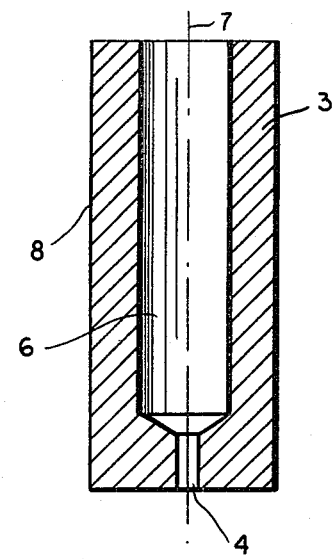

FIG. 2 shows such nozzle 3 which is provided with single axial orifice 4 in the longitudinal axis 7. The mantle surface 8 of the nozzle 3 is straight cylinder just as well as in case of the embodiment illustrated in FIG. 3. The interior 6 of the nozzle 3 is similarly cylindrical in both cases. In the solution according to FIG. 3 the irrigation water passes from the interior 6 through the radial orifices 5. Their axes are at an angle of 90° to the longitudinal axis 7 of the nozzle 3.

Figures 3, 4, 5:
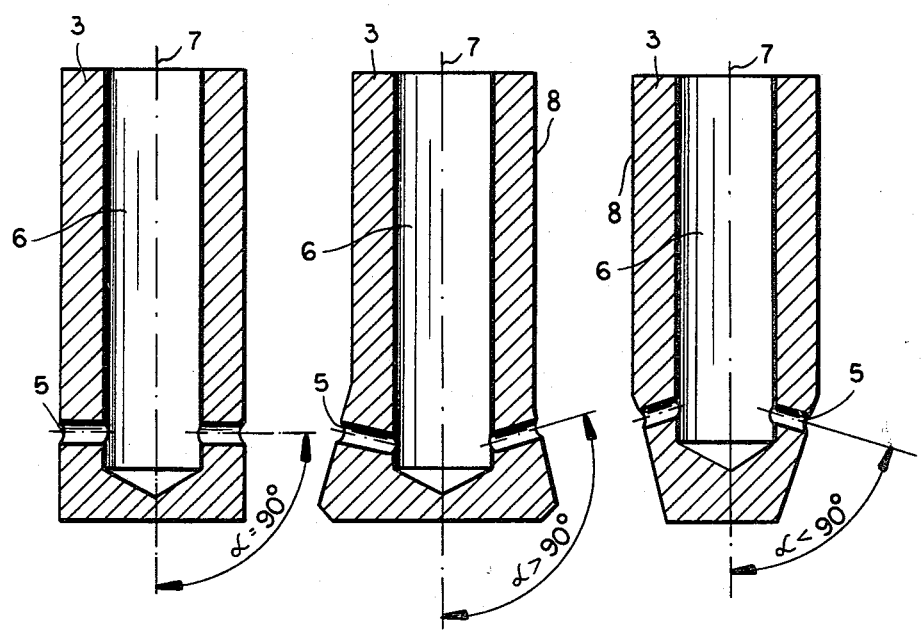

In FIGS. 4 and 5, the mantle surface 8 of the nozzle 3 is shaped in such a way that the part with the truncated cone mantle is connected with the cylindrical part. In FIG. 4 the truncated cone is of increasing diameter moving off and in relation to the mantle surface 8, while its diameter is decreasing in the embodiment shown in FIG. 5. In both cases the nozzle 3 is provided with the radial orifices 5 arranged on the truncated cone shaped part of the nozzle 3. FIG. 4 shows that axes of the radial orifices 5 are at an obtuse angle to the longitudinal axis 7 of the nozzle 3, while it is at acute angle in FIG. 5. FIGS. 2 to 5 show that the interior 6 of the nozzle 3 ends in a concave cone mantle shaped part at its end opposite the connection to the body 2.

Figure 6:
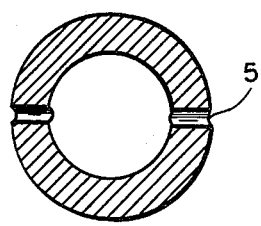
Figure 7:
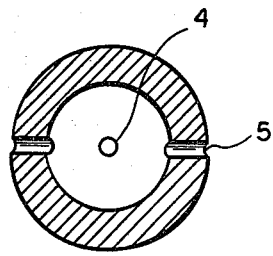
Figure 8:
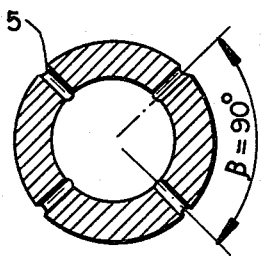
Figure 9:
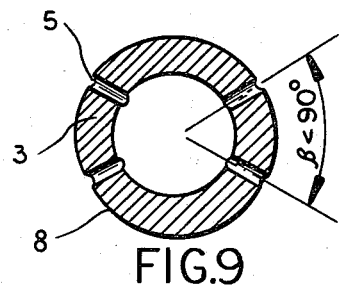

FIGS. 6 to 13 illustrate the cross section of the nozzle in the plane perpendicular to the longitudinal axis 7 of the nozzle in case of various embodiments. FIGS. 6 and 7 show two radial orifices 5 and these are combined with an axial orifice 4 too in case of FIG. 7. FIG. 8 shows four radial orifices 5 at 90° to each other, while in case of the nozzle cross sections shown in FIG. 9, four radial orifices are spaced along the mantle surface 8 of the nozzle 3 in such a way that the adjacent radial orifices 5 are at alternating acute and obtuse angles to each other.

Figure 10:
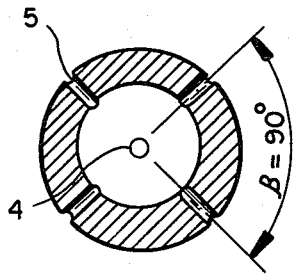

FIG. 10 similarly to FIG. 8 illustrates four radial orifices 5 at a central angle of 90° to each other, but the nozzle 3 is provided with the axial orifice 4 as well. The nozzle cross section in FIG. 11 can be regarded as a version of the solution shown in FIG. 9, where the radial orifices 5 are similarly associated with an axial orifice 4.

Figure 12:
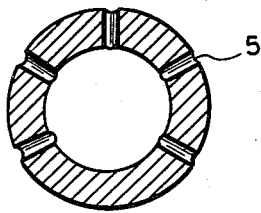
Figure 13:
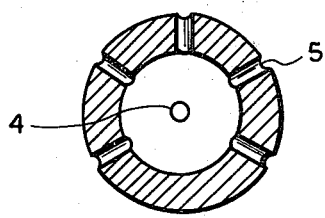

In FIG. 12 the nozzle 3 has five radial orifices 5, while in FIG. 13 besides the same spacing of the radial orifices 5, one axial orifice 4 is also available.

FIGS. 6 to 13 demonstrate that the water emerges in two, three, four, five or six jets from each water feeding head in accordance with the number of orifices. According to the agrotechnical experiences those embodiments of the nozzle 3 seem to be preferable, where no vertical water jet is discharged from the water feeding head. If the applied pressure does not exceed 0.75 m water column pressure, then the water passes out of the water feeding head not in the form of jet, but by drop feed. At such low pressures the moisture reaching the soil in vertical direction, has a favourable role.

The experiments conducted with drop feed and with discharge of the water jets of various directions and intensities demonstrate that drop feeding to a particular spot is not favourable, because the mineral substances washed out of the soil at the edge of the wetted strip of ground may produce permanent salt deposits. On the other hand at the water jet discharging heads width of the irrigated strip 11 can be varied within wide limits with variation of the pressure, the salt deposits can be reduced, then the still occurring minor salt deposits can be easily washed away through the so-called accumulated irrigation accomplished at the end of the growth season.

FIGS. 14 to 18 show the irrigation strip 11 and the network points 10 constituting a continuous system, which show where the water jets from the water feeding heads reach the ground. FIG. 14 shows for instance when the water feeding head is equipped with the double-jet nozzle 3 illustrated in FIG. 6. The irrigated strip 11 shown in FIG. 15 is pertinent to the nozzle cross section shown in FIG. 7. At this latter one it is apparent that now and then a network point 10 falls in the traceline of pipeline 1.

Figure 11:
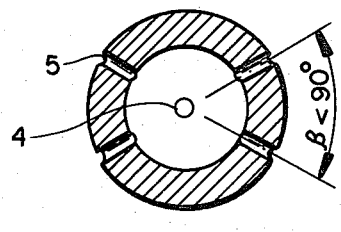

FIG. 16 illustrates the case when the four network points 10 are situated along the corner points of an imaginary square. This irrigation picture is pertinent to the nozzle cross section shown in FIG. 8. There is no separate diagram, but naturally it is easily conceivable that the imaginary square of FIG. 13 gets distorted to a rectangular shape if the nozzle 3 is of the cross section shown in FIG. 9. Similarly it is conceivable that the irrigation picture is complemented with the network point 10 in the traceline of the main pipeline 1 when the nozzle 3 is constructed as shown in FIGS. 10 or 11.

FIG. 17 illustrates such irrigated strip 11 that is pertinent to the nozzle cross section shown in FIG. 12. In the interest of lucidity, the network points 10 brought about by two consecutive water feeding heads were marked in the illustration which shows that the water feeding heads are spaced along the pipeline 1 in such a way that the irrigated strip is reached by the water jets in a "set pattern".

FIG. 18 similarly shows the irrigation picture pertinent to the nozzle section according to FIG. 13. The water jets reach the ground in both of the latter cases in network points 10, and seepage of the moisture starts out from these points. The water delivery pipeline 1 passes preferably in the approximate line of the row crops, e.g. fruit trees, and thus the strip of area crossed by the root system can be supplied with moisture at an approximately uniform rate.

The water feeding heads according to the invention are suitable for the realization of controlled irrigation—especially in case of loose soils and mainly for row crops—at a lower cost and more effectively than with the solutions existing until now.

What we claim is:

1. A drop-feed irrigation system for row crop watering comprising:
at least one pipeline spaced above the ground to be watered and for delivering water at a pressure of no more than 0.75 m water column and provided with a plurality of tubular bodies spaced along said pipeline and extending downwardly therefrom, each of said tubular bodies having a tapering configuration; and
respective one-piece nozzles interchangeably mounted on said tubular bodies, each of said nozzles being formed with a cylindrical portion having a bore open at one end for receiving said respective tubular body and communicating therethrough with said pipeline, said nozzle being further formed with a plurality of orifices, each having a diameter greater than 0.6 mm and formed at the other end of said nozzle and communicating with said bore, at least two of said orifices being directed laterally and substantially radially with respect to the axis of said nozzle, said orifices being axially spaced from the lower end of the respective tubular body, said orifices of said nozzle being so oriented and said tubular bodies being so positioned along said pipeline that water carried therein is discharged therefrom in a trickling stream onto said ground at a continuous network of watering points along said pipeline.

2. The system defined in claim 1 wherein said nozzle is further formed with a frustoconical portion at said other end thereof, said laterally directed orifices forming an angle other than 90° with the axis of said nozzle.

3. The system defined in claim 1 wherein at least one of said orifices is formed in said other end of said nozzle in alignment with the axis thereof.

* * * * *